June 16, 1936.  J. C. WOODCOCK  2,044,039
APPARATUS FOR DISTRIBUTING ROAD BINDING MATERIAL
Filed April 26, 1933
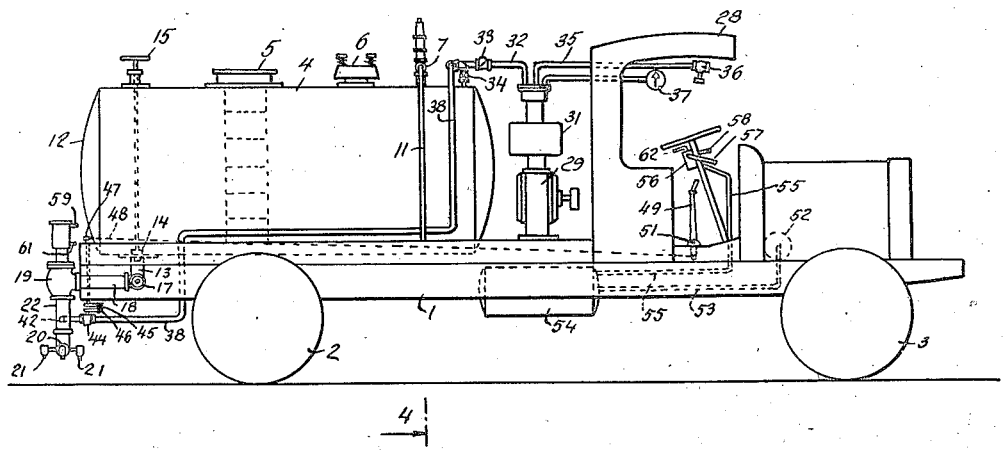
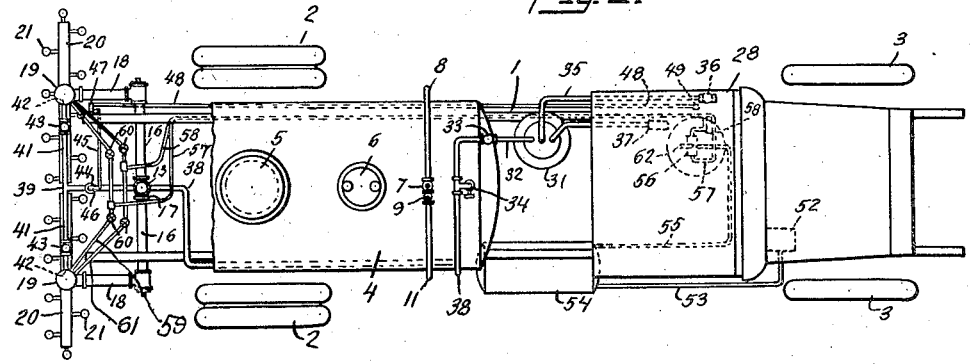
INVENTOR
Joseph C. Woodcock
BY
ATTORNEYS Patented June 16, 1936

2,044,039

UNITED STATES PATENT OFFICE 2,044,039

APPARATUS FOR DISTRIBUTING ROAD-BINDING MATERIAL

Joseph C. Woodcock, Cliffside Park, N. J., assignor to The Barrett Company, New York, N. Y., a corporation of New Jersey Application April 26, 1933, Serial No. 667,990

5 Claims. (Cl. 299—34)

This invention relates to apparatus for distributing liquid material, and more particularly, to a tank truck for distributing road-binding material, such as bituminous material, e. g., tar, coal tar pitch, etc., to roads or other surfaces.

One object of this invention is to provide a tank truck to distribute road-binding material equipped with pressure fluid operated valves for controlling the discharge of material from the tank, which valves may be opened and closed by the driver of the vehicle in the cab of the truck. Hence, one operator can drive the vehicle and also accurately control the discharge of the material from the tank.

Another object of this invention is to provide such truck with quick operating valves so that they may be readily and quickly opened and closed, permitting the application of the road-binding material to completely cover the desired surface without overrunning onto contiguous surface.

Other objects and advantages will appear from the following detailed description.

In the preferred embodiment illustrated on the drawing, the invention is shown incorporated in a tank truck for distributing road-binding material equipped with a compressor for delivering air under pressure to the liquid tank of the truck and the present description will be confined to the present illustrated embodiment of the invention. It will be understood, however, that the novel features and improvements are susceptible to other applications, such, for example, as trucks having a single spray bar or different arrangement of spray bars from that shown on the drawing, or equipped with compressors or other means for supplying pressure fluid other than air to the liquid tank. Hence, the scope of this invention is not confined to the embodiment herein described.

In the accompanying drawing, forming a part of this specification and showing, for purposes of exemplification, a preferred form of this invention without limiting the claimed invention to such illustrative instance—

Fig. 1 is a side elevation, somewhat diagrammatic in character, of a tank truck embodying this invention;

Fig. 2 is a plan view of the tank truck of Fig. 1, parts being broken away to show the pressure lines leading to the motors operating the valves controlling flow through the spray bars;

Fig. 3 is a rear end elevation of the tank truck of Fig. 1;

Fig. 4 is a fragmentary vertical section, partly in elevation, taken in the plane passing through line 4—4 of Fig. 1;

Fig. 5 is a side elevation of the three-way valve disposed in the cab of the truck for controlling the flow of pressure fluid to the pressure motors operating the valves controlling flow through the spray bars;

Fig. 6 is a plan view of the valve of Fig. 5; and

Fig. 7 is a vertical section, partly in elevation, through the pressure motor and valve controlling flow through the spray bars.

Referring to the accompanying drawing, I indicates the chassis of an automobile vehicle provided with wheels 2 and 3, the former of which are driven by the usual internal combustion engine (not shown). Suitably mounted on the chassis I is a tank 4 containing road-binding material. As customary, this tank is equipped with a man-hole 5 which may be used as a charging inlet, safety valve 6, an overflow outlet 7 provided with a flexible hose 8 for causing any liquid overflow to pass to the road surface, and valve-controlled air vent 9 communicating with a flexible hose II. In charging the tank, air vent 9 is opened to vent the tank to the atmosphere.

At the rear end 12 of the tank 4, a discharge passage 13 communicates with the base of the tank. Flow from the tank through this discharge passage is controlled by hand valve 14 operated by hand wheel 15. When the tank is in motion, i. e., moving to a desired destination, and is not delivering road-binding material to a road or other surface, the valve 14 is closed. Upon reaching the destination, the operator manually opens valve 14 and leaves this valve open throughout the operation of the truck.

Passage 13 is provided with arms 16 extending in opposite directions laterally towards the sides of the truck, away from the pipe 13 and connected thereto by a T joint 17. The arms 16 communicate with arms or passages 18, which in turn lead into casings 19, one disposed on each side of the truck as shown in Fig. 3. Two spray bars 20 are provided, each having a plurality of discharge nozzles 21 disposed in alternate relation on opposite sides of the spray bar, as more fully described in the patent to Woodcock, No. 1,884,475, granted October 25, 1932. The inlet extensions 22 of the spray bars communicate with the casings 19. Controlling flow through each casing 19 and the communicating spray bar 20 is a valve 23 comprising a seat 24 in the casing 19 and a valve stem 25 which is operated by the pressure motor 26.

The pressure motors each comprise a piston 27 which may be integral with the valve stem 25 and are operated by the admission and discharge of high pressure air thereto and therefrom, controlled by the driver in the cab 28 of the truck, as will more fully be described hereinafter.

Disposed on the chassis 1 of the truck is a compressor 29, which is driven from the engine of the truck in any well-known manner. Compressor 29 communicates with an air tank 31 connected by means of pipe 32 having check valve 33 therein with tank 4. Tank 31 is provided with a line 35 leading into the cab 28 of the truck. A regulating valve 36 is disposed in the line 35 where it is readily accessible to the driver. By adjusting the position of valve 36, desired pressure is maintained in tank 31 and the contents of liquid tank 4 is maintained under such pressure, valve 34 being open. A pressure meter 37 communicates with the tank 31 and is disposed in the cab of the truck where it is readily visible to the operator.

Leading from the pipe 32 and by-passing the tank 4 is a conduit 38 which communicates with a second conduit 39 having extensions 41 entering into the spray bars 21 at 42 (Figs. 2 and 3). Check valves 43 are disposed in the extensions 41 and prevent vapors from the road-binding material passing from the spray bar through the extensions 41, pipe 38 into air tank 31. A valve 44 (Fig. 2) is disposed in line 38 and is arranged to be operated by a lever 45 having one end secured to the operating lever 46 of the valve and the other end fastened to the bell crank 47. A rod 48 has one end secured to the bell crank 47 and the other end attached to a hand lever 49 pivoted at 51 in the cab 28. The operator, by moving lever 49, can at will open valve 44 to cause low pressure air to pass from tank 31 through pipe 38, extensions 41, and spray bars 21, removing residual road-binding material therein. Valve 44 could, of course, be operated by other mechanical means than the lever connections shown on the drawing.

A second compressor 52 is driven from the engine in the usual manner and supplies relatively high pressure air for the operation of the brakes of the truck. Compressor 52 is connected, by means of main 53, with a storage tank 54 suitably secured to the chassis 1 of the truck. A conduit 55 leads from tank 54 to a three-way valve 56 disposed in the cab 28 of the truck. Lines 57 and 58 lead from the valve 56 and communicate with lines 59 and 61 (Fig. 2), respectively, which are connected to the pressure or servo-motors 26. Hand valves 60 are disposed in lines 59 and 61. Three-way valve 56 is provided with a handle 62 for moving the valve stem and place, in the position of operation shown in Fig. 5, the high pressure inlet port 63 into which pipe 55 leads, into communication with pipe 57 and simultaneously places pipe 58 into communication with an exhaust port 64. In this position of valve 56, pressure fluid is supplied from tank 54 through pipe 57 into pressure motors pipe 59 connecting pipe 59 into pressure motors 26, depressing pistons 27 and closing valves 23, the pressure fluid from motors 26 flowing through pipes 61, 58 into three-way valve 56 through the exhaust port 64 into the atmosphere. Upon moving handle 62 so that pipe 58 is placed into communication with the high pressure inlet port 63 and pipe 57 is placed in communication with the exhaust port 64, high pressure air flows through pipes 58, 61 into pressure motors 26, elevating piston 27 opening valves 23, the air exhausting from motors 26 through pipes 59, 57 and exhaust port 64.

In operation, after the tank 4 has been filled with the road-binding material and the operator has reached the point where it is desired to distribute the material onto the road, valve 14 is opened by manipulation of the hand-wheel 15 and the valves 60 in the lines 59 and 61 are opened. The operator then proceeds to drive the truck. When the point is reached where he desires to apply the road-binding material, hand lever 62 of three-way valve 56 is manipulated to cause delivery of high-pressure air to the pressure motors 26, opening valves 23 as hereinabove described. Due to the use of high-pressure air for this purpose, the valves 23 open promptly. Road-binding material from tank 4 flows under the pressure maintained in the tank through the spray bars and is delivered to the road. When it is desired to interrupt the delivery of road-binding material, the driver manipulates hand lever 62 to move the three-way valve so that pressure fluid is supplied to the pressure cylinders 24 to move the pistons 27 in a reverse direction and close the valves 23. If it is desired to operate with only one spray bar, the hand valves 60 in the pipes 59 and 61 communicating with one pressure motor are closed so that pressure fluid is supplied only to the pressure motor actuating the valve in the spray bar it is desired to have operative. To remove any residual road-binding material in the spray bars and prevent the solidification of such material therein, hand lever 49 is operated immediately after valves 23 are closed to open valve 44 and permit low pressure air from the tank 31 to pass through pipes 38 and 41 into and through the spray bars.

The air supplied by the compressor 29 to the liquid tank 4 may be at a pressure of from 10 to 15 pounds. The air supplied by the second compressor, i. e., the compressor that delivers air for the operation of the brakes, is of a considerably higher pressure, of the order of seventy-five pounds. The use of such high pressure air for opening and closing the valves in the discharge passage, it has been found, permits ready and prompt opening and closing of these valves, resulting in the application of road-binding material to the desired surface without overrunning on the contiguous surfaces.

It will be understood that the apparatus may be equipped with gauges and other appliances commonly used in connection with tank trucks for distributing road-binding material which have not been illustrated on the drawing since they form no part of the present invention; for example, the tank truck may be equipped with heating appliances of any well-known type to maintain the contents of the tank 4 in liquid condition, etc.

Since different embodiments of the invention could be made without departing from the scope of this invention, it is intended that all matter contained in the above description or shown in the accompanying drawing shall be interpreted as illustrative and not in a limiting sense.

I claim:

1. In apparatus for distributing road binding material, in combination, a portable tank, a spray distributing head, a conduit connecting said tank and said distributing head, means for maintaining the contents of said tank under fluid pressure, a valve in said conduit for controlling discharge of said road binding material from said tank, and fluid pressure means independent of and at a pressure substantially greater than the pressure maintained on the contents of said tank for opening and closing said valve.

2. In an apparatus for distributing road binding material, in combination, a truck frame, a tank on said truck frame, a spray distributing head, a conduit connecting said tank and said spray distributing head, a valve in said conduit for controlling flow of road binding material therethrough, a compressor on the truck for delivering fluid under pressure to said tank to maintain the contents thereof under pressure, a servo-motor for operating said valve, a second compressor adapted to supply fluid at a pressure materially greater than that supplied by the first mentioned compressor, means for delivering fluid under pressure from said second compressor to said servo-motor to operate said valve, and means for introducing fluid under pressure into said conduit between the discharge end thereof and said valve to remove residual road binding material therefrom.

3. In a tank truck for distributing road-binding material, said truck having a cab thereon, a compressor for delivering fluid under pressure to said tank to maintain the contents thereof under pressure, a second compressor adapted to supply fluid at a pressure materially greater than that supplied by the first-mentioned compressor, a discharge pipe communicating with said tank, a valve in said pipe controlling flow therethrough, a pressure motor for operating said valve, means connecting the pressure motor with the second-mentioned compressor, and a valve disposed in the cab of said truck where it is readily accessible by the driver for controlling the flow of pressure fluid to said motor.

4. In a tank truck for distributing road-binding material, said truck having a cab thereon, a compressor for delivering fluid under pressure to the tank of said truck, a second compressor adapted to supply fluid at a pressure materially greater than that supplied by the first-mentioned compressor, said second compressor supplying the fluid utilized in the application of the brakes of said truck, a discharge pipe communicating with said tank, said pipe being provided with a pair of spray bars equipped with distributor nozzles for delivering the road-binding material onto a road surface, a valve controlling flow through each spray bar, a pressure motor for operating each valve, means connecting the pressure motor with the second-mentioned compressor, and a valve disposed in the cab of said truck where it is readily accessible to the driver for controlling the flow of pressure fluid to said motors.

5. In a tank truck for distributing road-binding material, said truck having a cab thereon, a compressor for delivering fluid under pressure to the tank of said truck, a second compressor adapted to supply fluid at a pressure materially greater than that supplied by the first-mentioned compressor, said second compressor supplying the fluid utilized in the application of the brakes of said truck, a discharge pipe communicating with said tank, said pipe being provided with a pair of spray bars equipped with distributor nozzles for delivering the road-binding material onto a road surface, a valve controlling flow through each spray bar, a pressure motor for operating each valve, means connecting the pressure motor with the second-mentioned compressor, a valve disposed in the cab of said truck where it is readily accessible to the driver for controlling the flow of pressure fluid to said motors, and means for supplying pressure fluid from the first-mentioned compressor to the spray bars to remove residual road-binding material therein, said last-mentioned means being controlled by a valve having control means disposed in the cab of said truck where the control means is readily accessible to the driver.

JOSEPH C. WOODCOCK.